No. 782,015. PATENTED FEB. 7, 1905.
C. ERNST.
WIRE REELING MACHINE.
APPLICATION FILED JULY 21, 1904.
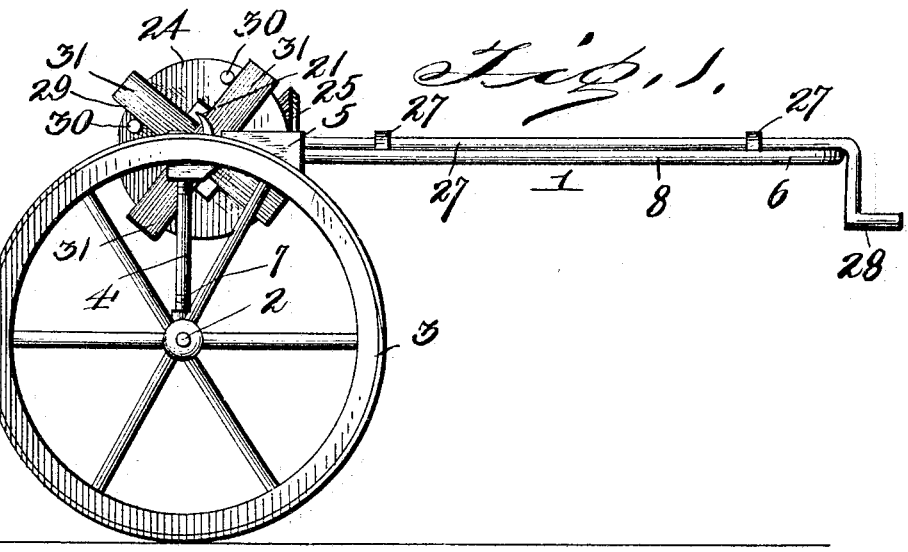
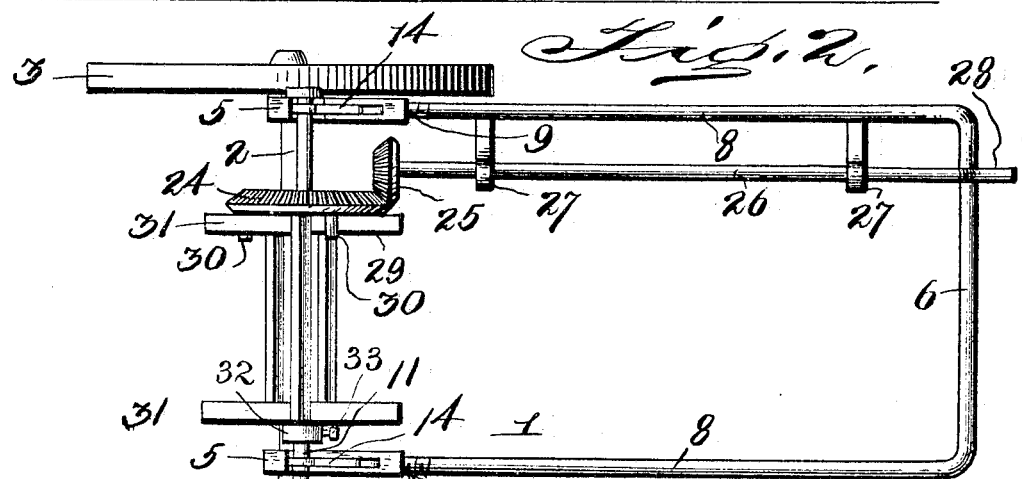
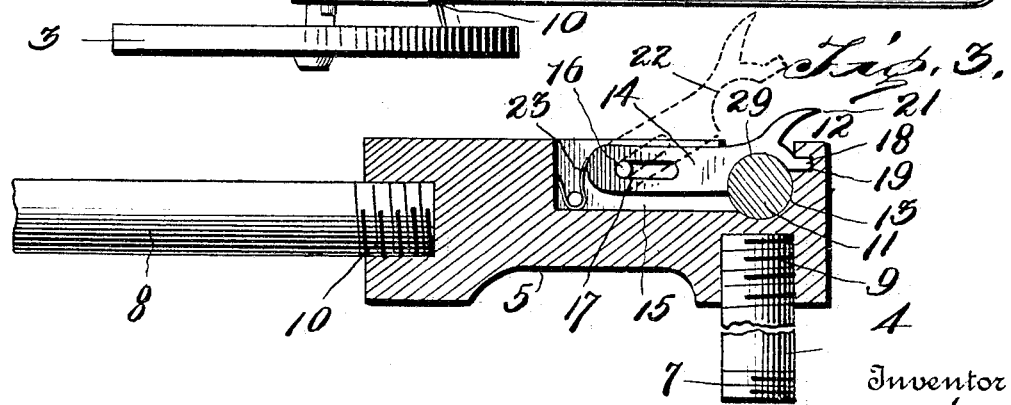
Witnesses
Jas. A. Koehl
C. H. Griesbauer
Inventor
Charles Ernst,
by H. B. Wilson
Attorney No. 782,015.                                                         Patented February 7, 1905.

UNITED STATES PATENT OFFICE.

CHARLES ERNST, OF HIGGINSVILLE, MISSOURI.

WIRE-REELING MACHINE.

SPECIFICATION forming part of Letters Patent No. 782,015, dated February 7, 1905.

Application filed July 21, 1904. Serial No. 217,552.

*To all whom it may concern:*

Be it known that I, CHARLES ERNST, a citizen of the United States, residing at Higginsville, in the county of Lafayette and State of Missouri, have invented certain new and useful Improvements in Wire-Reeling Machines; and I do declare the following to be a full, clear, and exact description of the invention, such as will enable others skilled in the art to which it appertains to make and use the same.

My invention relates to improvements in machines for handling fence-wire; and it consists in a reel removably mounted upon a portable truck and having means for winding and unwinding the fence-wire upon said reel.

The object of my invention is to provide a machine of this character which will be simple in construction, durable in use, efficient in operation, and comparatively inexpensive to manufacture.

The above and other objects, which will appear as the nature of my invention is better understood, I attain by the construction illustrated in the accompanying drawings, in which—

Figure 1 is a side elevation of my improved machine. Fig. 2 is a top plan view of the same. Fig. 3 is a detail sectional view through one of the coupling members of the frame, showing the bearing for one end of the spool or reel.

Referring to the drawings by numeral, 1 denotes a frame of a portable truck which consists of an axle 2, upon the ends of which supporting-wheels 3 are suitably journaled, two posts 4, projecting radially from said axle adjacent to its ends, two coupling members 5 upon the upper and outer ends of said posts 4, and a handle 6, consisting of a U-shaped frame which extends from said coupling members 5 at right angles to the posts 4. The lower ends of the posts 4 are preferably screw-threaded, as shown at 7, to permit them to be screwed into screw-threaded openings formed in the axle 2, and the connection between said posts and the couplings 5 and also between the arms 8 of the handle-frame 6 is effected by screw-threading the ends 9 and 10 of said posts and arms, respectively, to permit them to be screwed in screw-threaded openings formed in the couplings 5, as clearly shown in Fig. 3 of the drawings. The two coupling members 5 are connected by a spool or reel shaft 11, which is removably and rotatably mounted in bearings 12, formed in said couplings. As clearly shown in Fig. 3 of the drawings, each of said bearings comprises a bearing-recess 13, formed in one end of the coupling 5 and adapted to receive one end of the reel-shaft 11, and a latch 14, which is mounted in said coupling and is adapted to retain said shaft in said bearing-recess. Said latch 14 is mounted to slide and swing in a longitudinally-disposed recess 15, formed in the coupling 5 upon one side of the bearing-recess 13 and extending at right angles to the latter. This mounting of the latch is preferably effected by passing a pivot-pin 16 through a longitudinally-disposed slot 17, formed in the body portion of the latch adjacent to one of its ends. The opposite end of said latch is reduced, as shown at 18, to adapt it to enter a keeper-recess 19, formed in the coupling 5 upon the opposite side of the bearing-recess 13. The under side of that portion of the latch 14 which crosses the bearing-recess 13 is curved, as shown at 20, to conform to the curvature of the shaft 11, and upon the upper side of said portion of the latch is formed a finger-piece 21, by means of which the latch may be readily moved longitudinally in the recess 15 and swung upwardly to the dotted-line position (shown at 22 in Fig. 3) in order to permit the shaft 11 to be removed from the bearing-recess 13. In order to hold the latch 14 in its closed position, in which its end 18 is set in the keeper-recess 19, I provide in the recess 15 at the opposite end of the latch a spring 23, which is adapted to force the latch longitudinally, as will be readily seen upon reference to Fig. 3 of the drawings.

In order to rotate the wheel-shaft 11, I secure upon the same, adjacent to one of its ends, a bevel-gear 24. Said gear is in mesh with a bevel-pinion 25, secured upon one end of a longitudinally-disposed shaft 26, which is mounted in bearings 27, provided upon the handle-frame 6, as clearly shown in Fig. 2. Upon the opposite end of the shaft 26 is secured the crank-handle 28, by means of which the said shaft may be rotated to impart motion to the gear 24 and the spool or reel 11.

In order to secure upon the shaft 11 the reel or spool 29 upon which the fence-wire is to be wound or unwound, I form upon the rear face of the gear 24 at diametrically opposite points lugs or projections 30, which are adapted to engage the usual cleats 31 upon the spool or reel 29. Upon the shaft 11 at the opposite end of the spool or reel 29 I provide a collar 32, which is adjustably secured by means of a set-screw 33. Said collar is adjustable longitudinally upon the shaft 11, according to the length of the reel or spool 29, which it is adapted to hold in engagement with the lugs 30 upon the gear 24.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A machine of the class described, comprising an axle, supporting-wheels mounted upon said axle, posts projecting from said axle, couplings upon the outer end of said posts having bearing-recesses, a reel-shaft removably mounted in said bearing-recesses, a handle-frame connecting said couplings, a gear upon said reel-shaft having lugs adapted to engage a wire spring, reel or the like to lock it upon said shaft, a longitudinally-disposed shaft mounted in bearings upon said handle-frame, a gear upon one end of said longitudinal shaft in mesh with said gear upon said reel-shaft, and a crank-handle upon the opposite end of said longitudinal shaft, substantially as described.

2. In a machine of the class described, the combination of a frame having a bearing-recess and a spring-seated latch for retaining said shaft in said bearing-recess, substantially as described.

3. In a machine of the class described, the combination of a frame having couplings formed with a bearing-recess, a longitudinally-disposed recess extending at right angles to said bearing-recess upon one side thereof and a keeper-recess upon the other side of the same, a latch mounted to slide and swing in said longitudinally-disposed recess and a spring for holding one end of said latch in said keeper-recess, substantially as described.

In testimony whereof I have hereunto set my hand in presence of two subscribing witnesses.

CHARLES ERNST.

Witnesses.
 WM. FAHRMEIER,
 G. A. RAASCH.